United States Patent
Wood et al.

(10) Patent No.: US 12,308,623 B2
(45) Date of Patent: May 20, 2025

(54) CLAMPING DEVICE AND METHOD

(71) Applicant: UTILITY SOLUTIONS, INC., Hickory, NC (US)

(72) Inventors: Eugene H. Wood, Hickory, NC (US); Zachary Greer, Hickory, NC (US)

(73) Assignee: UTILITY SOLUTIONS, INC., Hickory, NC (US)

( * ) Notice: Subject to any disclaimer, the term of this patent is extended or adjusted under 35 U.S.C. 154(b) by 0 days.

(21) Appl. No.: 18/407,574

(22) Filed: Jan. 9, 2024

(65) Prior Publication Data

US 2024/0250511 A1   Jul. 25, 2024

Related U.S. Application Data

(60) Provisional application No. 63/481,436, filed on Jan. 25, 2023.

(51) Int. Cl.
*H02G 1/02* (2006.01)
*B25B 5/04* (2006.01)

(52) U.S. Cl.
CPC ............... *H02G 1/02* (2013.01); *B25B 5/04* (2013.01)

(58) Field of Classification Search
CPC . B25B 25/00; B25B 7/22; H02G 1/02; H02G 1/04; H02G 7/02; H02G 7/053; H02G 7/056; H02G 7/04; H02G 7/06; H02G 7/08
See application file for complete search history.

(56) References Cited

U.S. PATENT DOCUMENTS

2008/0047319 A1\* 2/2008 Thibault ................. B25B 5/147
                                                                72/416

\* cited by examiner

*Primary Examiner* — Tyrone V Hall, Jr.
(74) *Attorney, Agent, or Firm* — Shumaker, Loop & Kendrick, LLP; Brandon C. Trego

(57) ABSTRACT

A clamping device is disclosed. The clamping device including a first component pivotally connected to a second component, the first component having a first jaw and a first handle and the second component having a second jaw and a second handle, the second jaw cooperating with the first jaw to clamp a wire between the first and second jaws; a slot formed in the second jaw to receive a strap therein; and a gate pivotally connected to the second jaw, the gate securing the strap in the slot.

16 Claims, 7 Drawing Sheets

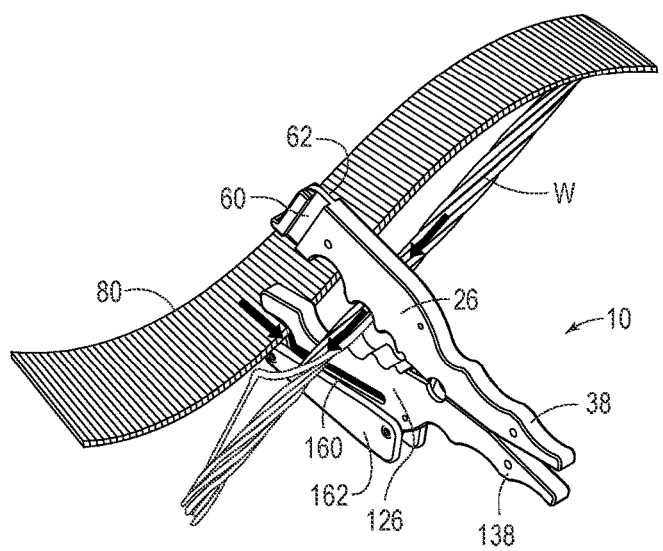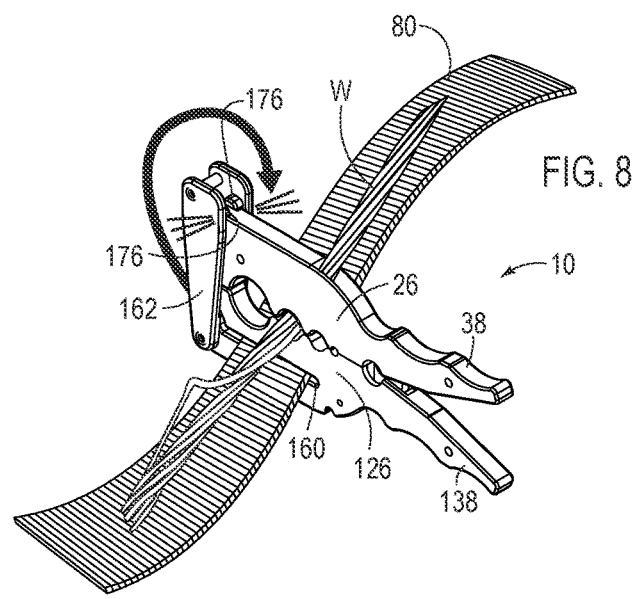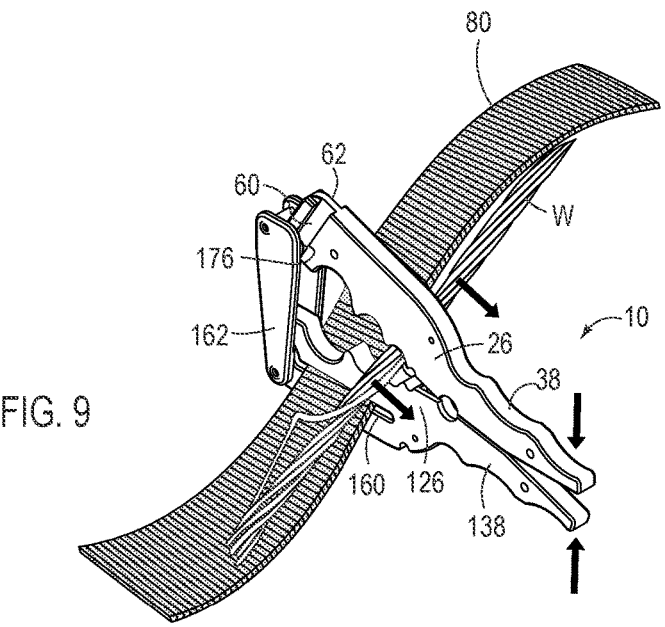

CLAMPING DEVICE AND METHOD

BACKGROUND OF THE INVENTION

This invention relates generally to electrical utility tools, and more particularly to a clamping device for use by utility workers.

Utility workers frequently carry out installation, maintenance, or repair on electrical transmission or distribution lines (conductors) mounted above ground level (i.e., "overhead wires"). Part of this work involves hanging and tensioning new distribution lines or applying proper tension to existing distribution lines.

One of the issues when tensioning distribution lines is that a free end (tail) of the distribution line hangs unwieldly during the tensioning process. As the lines are tensioned, the free end gets longer and more unwieldly which could result in injury and entanglements. Further, if the free end contacts an energized phase or ground, the utility worker could be subjected to electrical shock.

BRIEF SUMMARY OF THE INVENTION

This problem is addressed by a hand-operated clamping device that secures the free end of the distribution line to a strap of a strap hoist.

According to an aspect of the invention, a clamping device includes a first component pivotally connected to a second component, the first component having a first jaw and a first handle and the second component having a second jaw and a second handle, the second jaw cooperating with the first jaw to clamp a wire between the first and second jaws; a slot formed in the second jaw to receive a strap therein; and a gate pivotally connected to the second jaw, the gate securing the strap in the slot.

According to another aspect of the invention, a clamping device includes a first component pivotally connected to a second component, the first component having a first jaw and a first handle and the second component having a second jaw and a second handle, the second jaw cooperating with the first jaw to clamp a wire between the first and second jaws; a slot formed in the second jaw to receive a strap therein, the slot bifurcating and extending from a first end of the second jaw to a central portion of the second component; and a gate pivotally connected to the second jaw, the gate securing the strap in the slot.

BRIEF DESCRIPTION OF THE DRAWINGS

The invention may be best understood by reference to the following description taken in conjunction with the accompanying drawing figures, in which:

FIG. 7 shows the clamping device of FIG. 1 being positioned on a free end (tail) of a distribution line;

FIG. 8 shows the clamping device of FIG. 1 being secured to the free end of the distribution line; and FIG. 9 shows the clamping device of FIG. 1 retaining a strap of a strap hoist while allowing the clamping device to be adjusted on the free end of the distribution line.

DETAILED DESCRIPTION OF THE INVENTION

Figure 1:
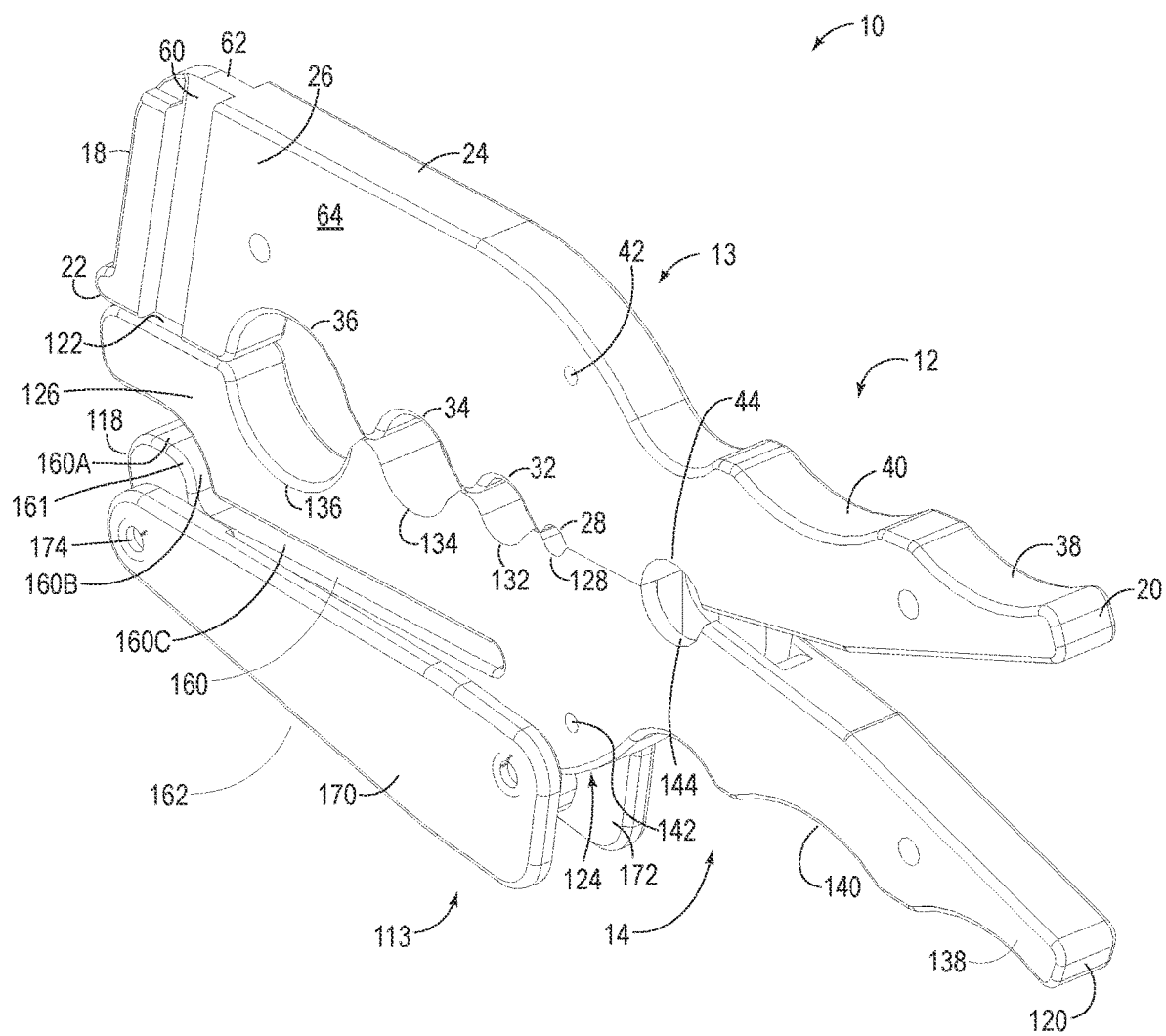
FIG. 1 is a perspective view of an exemplary clamping device, in a closed position.
Figure 2:
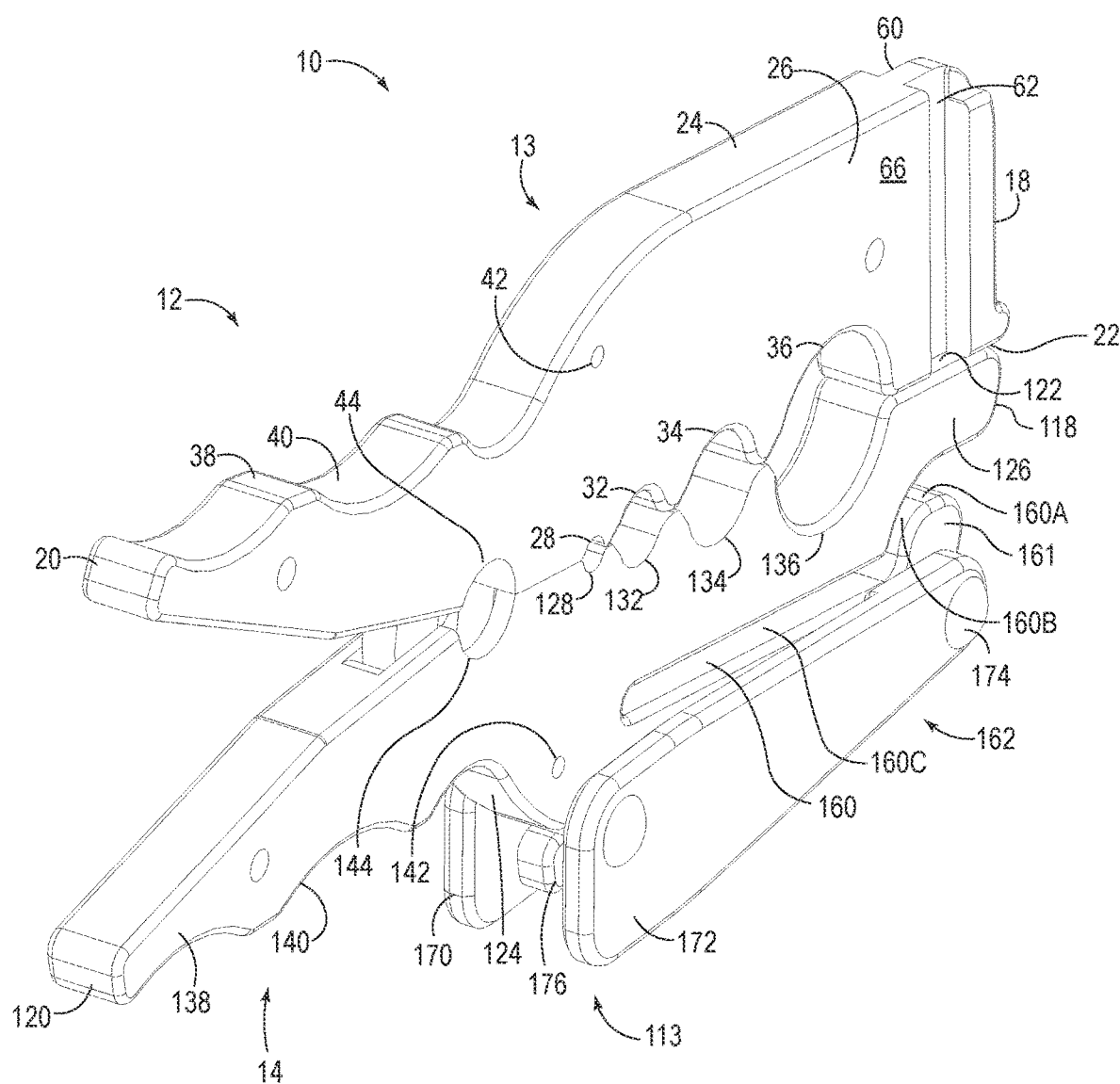
FIG. 2 is a perspective view of the clamping device of FIG. 1, in a closed position.
Figure 3:
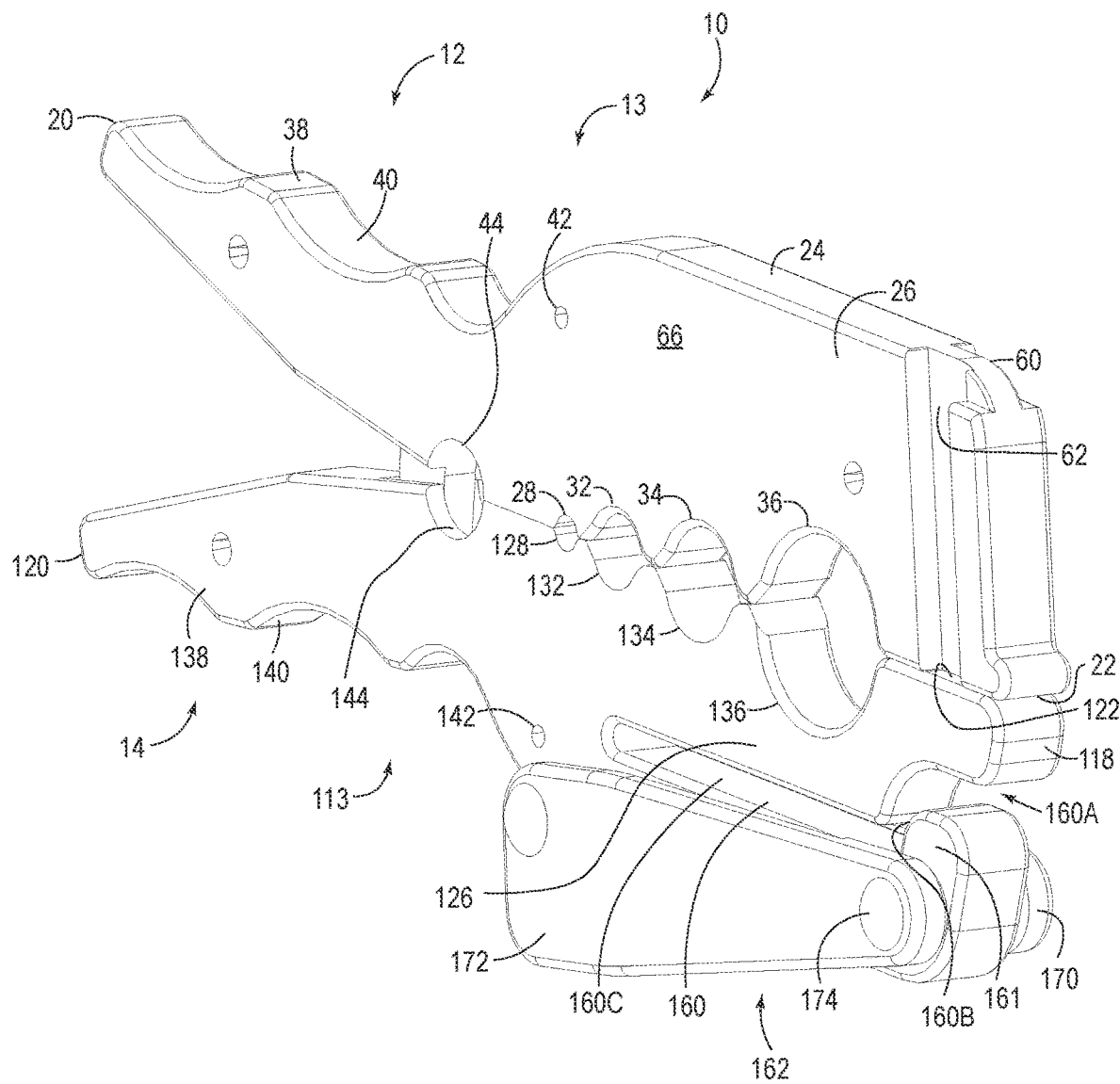
FIG. 3 is a perspective view of the clamping device of FIG. 1, in a closed position.
Figure 4:
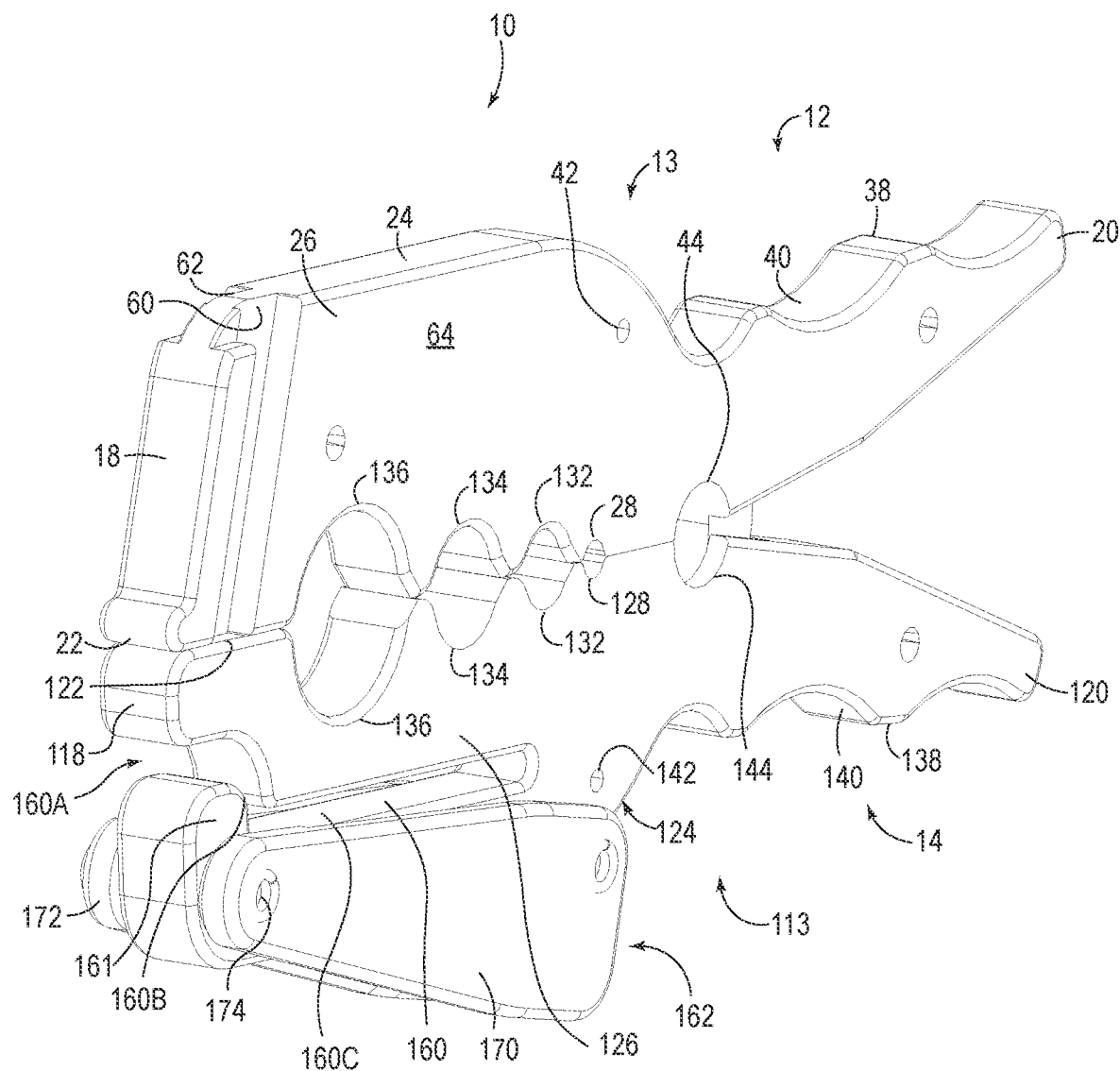
FIG. 4 is a perspective view of the clamping device of FIG. 1 in a closed position.

Referring to the drawings wherein identical reference numerals denote the same elements throughout the various views, FIGS. 1-6 illustrate an exemplary clamping device 10. It includes a first component 12 pivotally joined to a second component 14 by a spring 16.

The first component 12 extends between a first end 18 and a second end 20 and includes an inner face 22 and an outer face 24. Adjacent the first end 18, the inner face 22 is formed into a first jaw 26 having one or more concave recesses. In the illustrated example, there is a first recess 28, a second recess 32, a third recess 34, and a fourth recess 36, each of which is roughly semi-cylindrical in shape. The recesses 28, 32, 34, and 36 are different sizes to accommodate different wire diameters (i.e., wire gauge). Other shapes such as V-notches or square notches could be substituted.

Adjacent the second end 20, the first component 12 is formed into a first handle 38. In the illustrated example, the portion of the outer face 24 within the first handle 38 forms one or more concave finger grip recesses 40.

Near a central portion 13 of the first component 12, a first spring anchor 42 is defined. In the illustrated example, the first spring anchor 42 is an aperture configured to receive an end of the spring 16 therein; however, it should be appreciated that the first spring anchor 42 may also be a notch formed in the outer face 24. Also near the central portion 13 of the first component 12, the inner face 22 defines a spring pocket 44.

First jaw 26 also includes first and second slots 60 and 62 formed adjacent first end 18. The first and second slots 60, 62 run substantially perpendicular to outer face 24 between outer face 24 and inner face 22. First slot 60 is formed in a first side 64 of the first jaw 26 and second slot 62 is formed in a second side 66 of the first jaw 26. As shown, the first and second slots 60, 62 are positioned in a back-to-back configuration; however, it should be appreciated that the first and second slots 60, 62 may also be staggered.

The second component 14 extends between a first end 118 and a second end 120 and includes an inner face 122 and an outer face 124. Adjacent the first end 118 the inner face 122 is formed into a second jaw 126 having one or more concave recesses. In the illustrated example, there is a first recess 128, a second recess 132, a third recess 134, and a fourth recess 136, each of which is roughly semi-cylindrical in shape. The recesses 128, 132, 134, and 136 are different sizes to accommodate different wire diameters (i.e., wire gauge). Other shapes such as V-notches or square notches could be substituted.

Adjacent the second end 120, the second component 14 is formed into a second handle 138. In the illustrated example, the portion of the outer face 124 within the second handle 138 forms one or more concave finger grip recesses 140.

Near a central portion 113 of the second component 14, a second spring anchor 142 is defined. As illustrated, the second spring anchor 142 is an aperture configured to receive an end of the spring 16 therein; however, it should be appreciated that the second spring anchor 142 may also be a notch formed in the outer face 124. Also near the central portion 113 of the second component 14, the inner face 122 defines a spring pocket 144.

Figure 5:
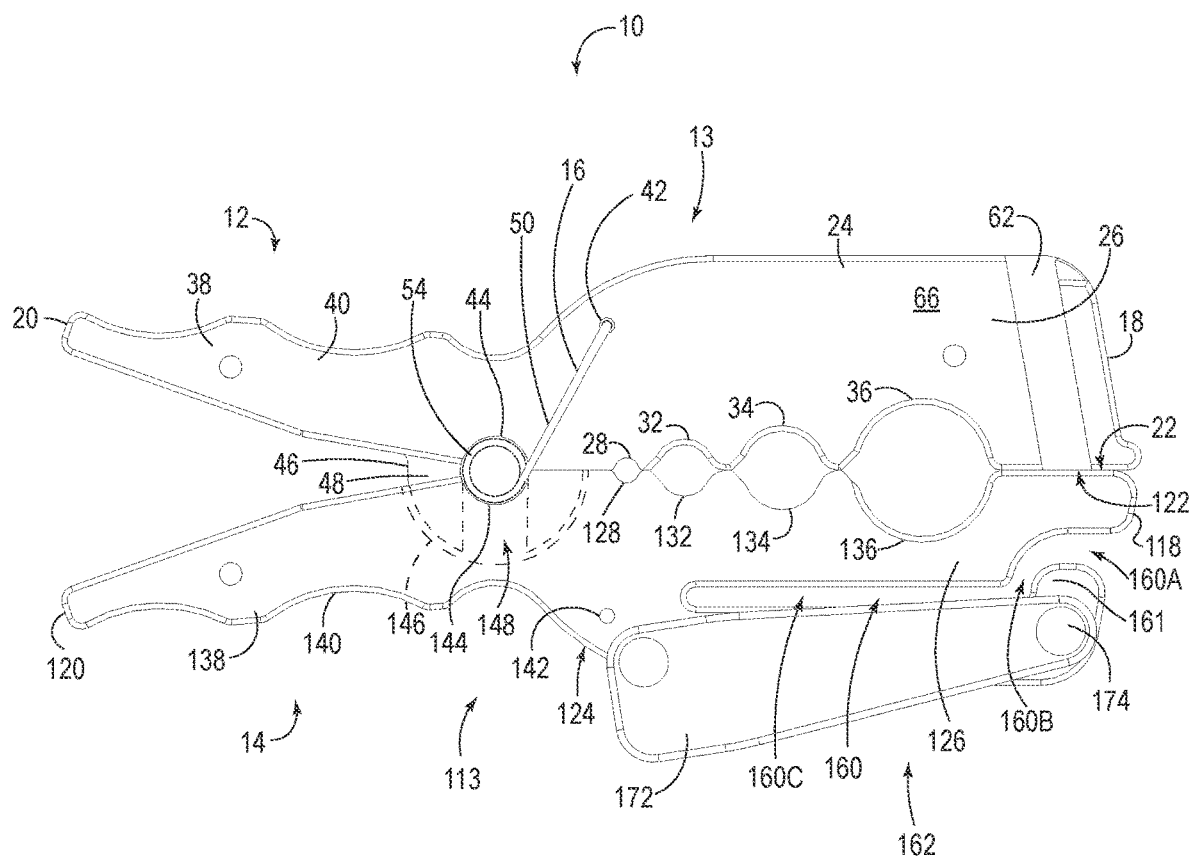
FIG. 5 is a plan view of the clamping device of FIG. 1, in a closed position.
Figure 6:
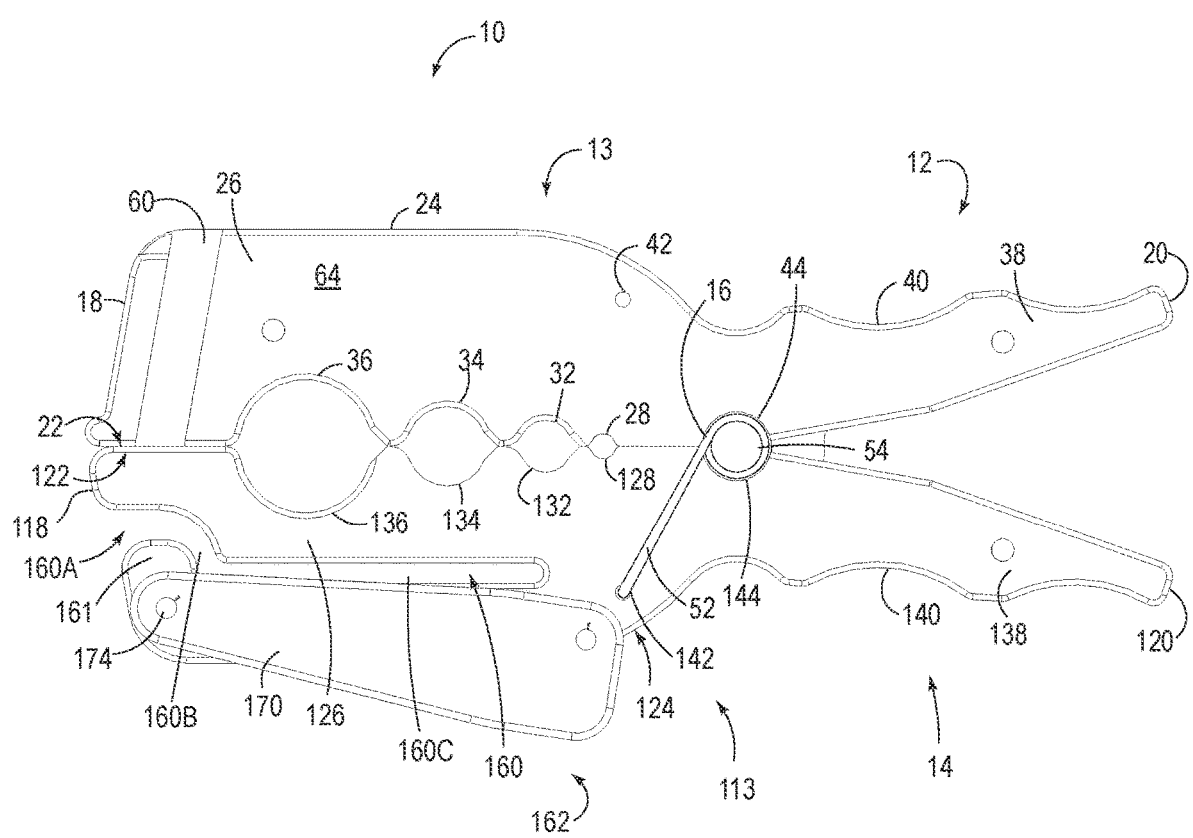
FIG. 6 is a plan view of the clamping device of FIG. 1 in a closed position.

Referring specifically to FIG. 5, the first and second components 12, 14 collectively define a pivot connection. In the illustrated example, the first component 12 includes a circular pivot member 46 which is concentric with the spring pocket 42. The outer surface 48 of the pivot member 46 is a portion of a cylinder. The interior of the second component 14 includes a pivot recess 146 which has an interior surface 148 that is a portion of a cylinder. When the two components 12, 14 are engaged with each other, the outer surface 48 can ride against the interior surface 148, permitting pivoting movement between a closed position (FIG. 5) and an open position (FIG. 7). Other forms of pivoting connections may be substituted for the structure shown.

Spring 16 biases the jaws 26, 126 towards the closed position. As illustrated, spring 16 is a torsion spring having one leg 50 received in the first spring anchor 42 and the other leg 52 received in the second spring anchor 142. A central coil 54 of the spring 16 is positioned between the spring pockets 44, 144.

Referring again to the second component 14, a slot 160 is formed in the second jaw 126. The slot 160 extends from first end 118 inwardly towards the central portion 113 to a location between the outer surface 124 and the recesses 128, 132, 134, and 136 and extends lengthwise from about a middle of recess 132 to first end 118. It should be appreciated that the slot length and location may be made to work with different applications. The slot 160 is configured to receive a strap 80 of a strap hoist, FIGS. 7-9, therein.

As illustrated, the first end 118 is bifurcated by the slot 160. The slot 160 being formed of a first section 160A which bifurcates the first end 118 and extends inwardly towards the central portion 113 and is configured to receive strap 80 therein, a second section 160B which turns substantially perpendicular to first section 160A to form a lip and or stop 161, and a third section 160C which turns substantially perpendicular to the second section 160B and extends inwardly towards the central portion 113. The third section 160C provides a secure and/or storage location for strap 80 when the clamping device 10 is being used while stop 161 prevents the strap 80 from sliding out of the slot 160.

A gate 162 is connected to the second jaw 126 of the second component 14 adjacent the first end 118. The gate 162 is formed of a pair of fingers 170 and 172. The fingers 170 and 172 are positioned on opposing sides 164, 166 of the second jaw 126 and operably connected together by pivot pin 174 extending through the fingers 170, 172 and the second jaw 126 adjacent the first end 118. The gate 162 interacts with the slot 160 by closing and opening the slot 160 when the gate 162 is moved between a storage position (FIG. 1) and a use position (FIG. 8). The fingers 170 and 172 each including a knob and/or pin 176 extending inwardly towards opposing fingers 170, 172 such that each of the pins 176 are positioned adjacent the outer face 124 when the gate 162 is in the storage position. It should be appreciated that the gate 162 may also be employed using only one pin 176 extending inwardly from one of the fingers 170 or 172.

The components 12, 14 and gate 162 of the clamping device 10 may be made of any material having suitable strength, for example, metal, plastic, or a composite such as fiberglass-reinforced nylon. For insulated applications, an electrically nonconductive material is preferred. Each component 12, 14 of the clamping device 10 may be of unitary or monolithic construction, i.e., could be made by forging, stamping, molding, etc.

Referring to FIGS. 7-9, the jaws 26, 126 of the clamping device 10 are sized and shaped to fit over a tail wire "W" of the distribution line. It is opened by squeezing the handles 38, 138 together, spreading the jaws 26, 126 apart. Once in the opened position, the wire W is positioned between the first and second jaws 26, 126 and the strap 80 is slid into the slot 60. The handles 38, 138 are then released. The jaws 26, 126, under spring pressure, engage the wire W and hold the clamping device 10 in place securely on the wire W. Gate 162 is pivoted about pivot pin 174 to close off slot 162 and secure strap 80 in the slot 160. The gate 162 maintains the strap 80 in the slot 160 while allowing the strap 80 to freely slide therein. Installation would typically be carried out by a worker in an elevated location such as a boom truck bucket. Gate 162 is pivoted such that gate 162 is adjacent first ends 18, 118 and each of the pins 176 are positioned in slots 60 and 62 respectively. It should be appreciated that in the case of only one pin 176, only that pin would be in one of the slots 60, 62. Once the pins 176 are positioned in the slots 60, 62, the clamping device 10 may be opened to allow the clamping device 10 to be adjusted on wire W without opening slot 160 and releasing the strap 80.

Thus installed, as the strap hoist is used to tension the distribution line, strap 80 slides within the slot 160 to allow the clamping device and wire W to move along the strap hoist as the distribution line is tensioned without creating a bubble or bend in the wire W; thus, keeping the wire W secured to the strap hoist in a controlled manner and preventing injury or entanglements.

The clamping device 10 described herein has advantages over prior art techniques. It will improve safety by securing and controlling the wire W during the tensioning process and by eliminating bubbles or bends in the wire W that would otherwise be created by the prior art techniques (i.e., the use of ropes or tape).

The foregoing has described a utility line clamping device. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A clamping device, comprising:
 a first component pivotally connected to a second component, the first component having a first jaw and a first handle and the second component having a second jaw and a second handle, the second jaw cooperating with the first jaw to clamp a wire between the first and second jaws, wherein the first jaw and second jaw move between a closed position where the wire is clamped between the first and second jaws and an open position where the wire is received between or removed from the first and second jaws, the first and second jaws being biased to the closed position by a spring;

a slot formed in the second jaw to receive a strap therein; and a gate pivotally connected to the second jaw, the gate securing the strap in the slot.

2. The clamping device according to claim 1, wherein the slot includes a first slot portion extending inwardly toward a center of the clamping device, a second slot portion extending substantially perpendicular to the first slot portion, and a third slot portion extending substantially perpendicular to the second slot portion, the third slot portion extending inwardly toward a center of the clamping device.

3. The clamping device according to claim 1, further including first and second slots positioned adjacent to a first end of the first jaw.

4. The clamping device according to claim 3, wherein, in use, the gate is pivoted such that the gate is adjacent the first end and at least one pin connected to the gate is positioned in one of the respective first and second slots, the at least one pin configured to slide in the respective slot as the clamping device is moved between a closed position and an open position.

5. A clamping device, comprising:
a first component pivotally connected to a second component, the first component having a first jaw and a first handle and the second component having a second jaw and a second handle, the second jaw cooperating with the first jaw to clamp a wire between the first and second jaws;

a spring, the spring biasing the clamping device into a closed position;

a slot formed in the second jaw to receive a strap therein, the slot bifurcating and extending from a first end of the second jaw to a central portion of the second component; and a gate pivotally connected to the second jaw, the gate securing the strap in the slot.

6. The clamping device according to claim 5, wherein the first and second handles move the first jaw and second from a closed position where the wire is clamped to an open position where the wire is received by or removed from the clamping device.

7. The clamping device according to claim 5, further including a first slot formed in a first side of the first jaw and a second slot formed in a second side of the first jaw, the first and second slots being positioned adjacent to a first end of the first jaw.

8. The clamping device according to claim 7, wherein the gate pivots between a storage position and a use position, and wherein in the use position, the gate cooperates with the first and second slots to maintain the gate in the use position as the clamping device is moved from a closed position to an open position.

9. The clamping device according to claim 5, wherein the first jaw includes a plurality of first recesses and the second jaw includes a plurality of second recesses aligned with the plurality of first recesses of the first jaw, the first and second recesses being configured to receive wires of different sizes.

10. A method of using the clamping device of claim 1 to clamp a free end of a distribution line during a tensioning process, comprising the steps of:
moving the first and second jaws from a closed position to an open position;

positioning the wire between the first and second jaws; and moving the first and second jaws from the open position to the closed position to clamp the wire.

11. The method according to claim 10, further including the step of positioning the strap into the slot.

12. The method according to claim 11, further including the step of moving the gate from a storage position to a use position.

13. The method according to claim 12, further including the step of positioning a pin of the gate into a slot of the first jaw to secure the gate and close the slot.

14. The method according to claim 13, wherein the slot on the first jaw is adjacent to a first end of the first jaw, the slot allowing the pin of the gate to move therein as the first and second jaws are moved between the open and closed positions.

15. The method according to claim 10, wherein the first and second jaws are biased into the closed position by a spring.

16. The method according to claim 10, wherein the step of positioning the wire between the first and second jaws further includes the step of positioning the wire into a recess sized to mate with the wire.

* * * * *